(12) United States Patent
Komanduri et al.

(10) Patent No.: US 10,810,105 B2
(45) Date of Patent: Oct. 20, 2020

(54) LOGGING STORED INFORMATION FOR IDENTIFYING A FIX FOR AND/OR A CAUSE OF AN ERROR CONDITION

(71) Applicant: International Business Machines Corporation, Armonk, NY (US)

(72) Inventors: Ravi K Komanduri, Bangalore (IN); Malahal Naineni, Bangalore (IN); Sachin C. Punadikar, Pune (IN); Madhu M. Thorat, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/242,936

(22) Filed: Jan. 8, 2019

(65) Prior Publication Data
US 2020/0218635 A1 Jul. 9, 2020

(51) Int. Cl.
*G06F 11/36* (2006.01)

(52) U.S. Cl.
CPC ........ *G06F 11/364* (2013.01); *G06F 11/3612* (2013.01); *G06F 11/3664* (2013.01)

(58) Field of Classification Search
CPC .................................................... G06F 11/364
USPC ......................................................... 717/128
See application file for complete search history.

(56) References Cited

U.S. PATENT DOCUMENTS

| | | | |
|---|---|---|---|
| 5,581,696 A * | 12/1996 | Kolawa | G06F 11/3624 |
| | | | 714/38.1 |
| 6,106,574 A * | 8/2000 | Baisley | G06F 8/42 |
| | | | 717/140 |
| 7,080,360 B2 * | 7/2006 | Bates | G06F 11/362 |
| | | | 714/E11.209 |
| 7,996,822 B2 * | 8/2011 | Phillips | G06F 11/3636 |
| | | | 714/38.1 |
| 8,578,340 B1 * | 11/2013 | Daudel | G06F 9/45504 |
| | | | 710/266 |
| 9,104,797 B1 | 8/2015 | Sekhar et al. | |

(Continued)

OTHER PUBLICATIONS

Peter Ohmann et al.; "Lightweight Control-Flow Instrumentation and Postmortem Analysis in Support of Debugging"; Automated Software Engineering; Dec. 1, 2017 (Year: 2017).*

(Continued)

*Primary Examiner* — Qing Chen
*Assistant Examiner* — Clint Thatcher
(74) *Attorney, Agent, or Firm* — Zilka-Kotab, P.C.

(57) ABSTRACT

A computer-implemented method according to one embodiment includes determining locations of debugging statements within a computer code, and determining identifying information for each of the discovered debugging statements within the computer code. The identifying information is stored without the debugging statements. The method further includes accessing the identifying information for using in debugging the error condition in response to determining that an error condition has occurred in an execution path. A computer program product for resolving error conditions using limited stored identifying information of a computer code according to another embodiment includes a computer readable storage medium having program instructions embodied therewith. The program instructions are readable and/or executable by a computer to cause the computer to perform the foregoing method.

19 Claims, 4 Drawing Sheets

```
400 define TraceDebug() do {                    402
    if (trace enabled) {
        Log trace message;
    } else {            404
        /* store file identify and line number. Or just the    406
         * instruction address value to decode the source and line
         * number later while logging.
         */
        trace_store[next_entry] = {FILE_NUM, LINE_NUM};
        next_entry = (next_entry + 1) % TRACE_SIZE
    }
} while (0)

#define LogError() do {           408
    if (not trace enabled) {
        dump all entries from trace store
    }
    now do the regular job!
} while (0)
```

(56) References Cited

U.S. PATENT DOCUMENTS

| | | | |
|---|---|---|---|
| 2005/0028145 A1* | 2/2005 | Kang | G06F 11/3636 |
| | | | 717/128 |
| 2012/0110555 A1* | 5/2012 | Bates | G06F 11/362 |
| | | | 717/129 |
| 2014/0245085 A1 | 8/2014 | Halverson et al. | |
| 2014/0282428 A1* | 9/2014 | Andre | G06F 11/3636 |
| | | | 717/128 |
| 2016/0246703 A1 | 8/2016 | Bank et al. | |

OTHER PUBLICATIONS

"Hash Function"; Wikipedia.com website; Dec. 14, 2018 (Year: 2018).*
Chen et al.; "Reversible Debugging Using Program Instrumentation"; IEEE Transactions on Software Engineering, vol. 27, No. 8 (pp. 715-727); Aug. 2001 (Year: 2001).*

* cited by examiner

400

```
#define TraceDebug() do {
    if (trace enabled) {                          402
        Log trace message;
    } else {                    404
        /* store file identify and line number. Or just the         406
         * instruction address value to decode the source and line
         * number later while logging.
         */
        trace_store[next_entry] = {FILE_NUM, LINE_NUM};
        next_entry = (next_entry + 1) % TRACE_SIZE
    }
} while (0)

#define LogError() do {                 408
    if (not trace enabled) {
        dump all entries from trace store
    }
    now do the regular job!
} while (0)
```

FIG. 4

LOGGING STORED INFORMATION FOR IDENTIFYING A FIX FOR AND/OR A CAUSE OF AN ERROR CONDITION

BACKGROUND

The present invention relates to decoding of error conditions, and more specifically, this invention relates to using only identifying saved information of decoding statements of a computer code for identifying a fix for and/or a cause of an error condition.

Conventional software products typically at least once experience an error condition during an execution path. For example, some of such error conditions may include, e.g., a corrupt record, run-time errors, thread errors, etc.

Some software products incorporate extensive trace messages for use in debugging such errors. Tracing is for the most part enabled in early development of the software products, but thereafter disabled prior to and/or upon such software products entering production environments, e.g., for performance reasons. Accordingly, upon an error condition occurring within the production environment, accompanying trace messages are typically not available for performing root cause analysis on the error.

SUMMARY

A computer-implemented method according to one embodiment includes determining locations of debugging statements within a computer code, and determining identifying information for each of the discovered debugging statements within the computer code. The identifying information is stored without the debugging statements. The method further includes accessing the identifying information for using in debugging the error condition in response to determining that an error condition has occurred in an execution path.

A computer program product for resolving error conditions using limited stored identifying information of a computer code according to another embodiment includes a computer readable storage medium having program instructions embodied therewith. The program instructions are readable and/or executable by a computer to cause the computer to perform the foregoing method.

A system according to another embodiment includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is pseudocode for trace messages, in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for using saved information identified for decoding statements of a computer code for identifying a fix for and/or a cause of an error condition.

In one general embodiment, a computer-implemented method includes determining locations of debugging statements within a computer code, and determining identifying information for each of the discovered debugging statements within the computer code. The identifying information is stored without the debugging statements. The method further includes accessing the identifying information for using in debugging the error condition in response to determining that an error condition has occurred in an execution path.

In another general embodiment, a computer program product for resolving error conditions using limited stored identifying information of a computer code includes a computer readable storage medium having program instructions embodied therewith. The program instructions are readable and/or executable by a computer to cause the computer to perform the foregoing method.

In another general embodiment, a system includes a processor and logic integrated with the processor, executable by the processor, or integrated with and executable by the processor. The logic is configured to perform the foregoing method.

Figure 1:
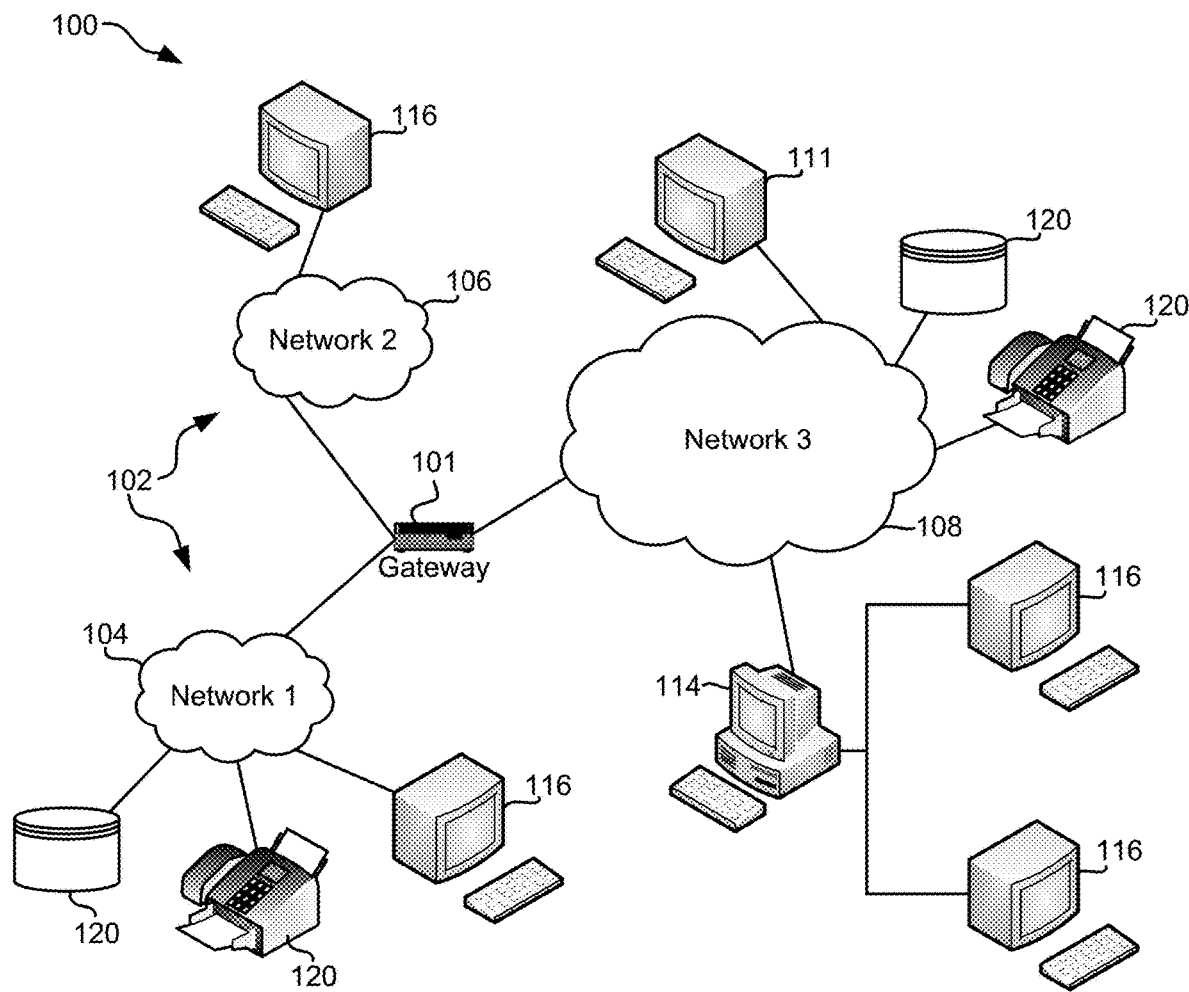
FIG. 1 is a network architecture, in accordance with one embodiment.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
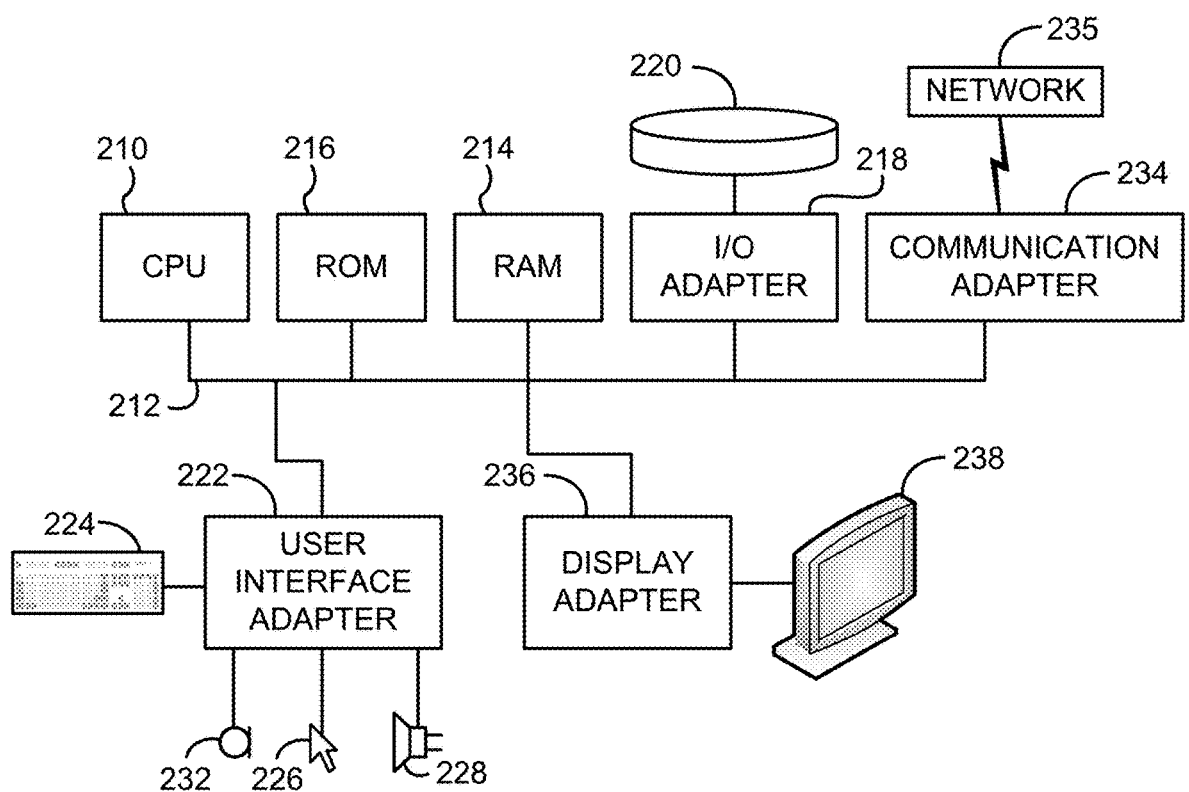
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

As mentioned elsewhere herein, some conventional software products incorporate extensive trace messages for use in debugging error conditions. Tracing is for the most part enabled in early development of such software products, but thereafter disabled prior to and/or upon such software products entering production environments, e.g., for performance reasons.

Upon one or more error condition occurring within a software product that is in the production environment, because tracing was previously disabled upon entering the production environment, there are typically no accompanying trace messages available to use in performing root cause analysis on the error, e.g., for determining a cause and a fix for the error. Accordingly, debugging performed subsequently on the software product entering a production environment is time consuming. This is because debugging of conventional software products includes having to resort to logging an extensive amount of files in an attempt to recreate and thereby establish a fix for a detected error condition. One conventional tracing technique utilized to perform such extensive logging includes utilizing, e.g., memory tracing, ring buffer(s), buffered tracing, a logger function, etc., which will herein be collectively referred to as "ring buffers." However, ring buffers consume a significant amount of overhead of a software product such as of a computer, as memory of the computer as a result of utilizing ring buffers, contains all known trace data. This trace data includes the output of executed trace statements that typically have variable names, function names, values, large strings, etc. Note that this extensive amount of stored trace data (which is typically stored on disk of a device) cannot be reduced, as the entire extent of stored data is utilized for debugging by the ring buffer. In addition to the significant consumption of memory, ring buffers also utilize string processing, which slows overall processing of a computer using the software product, and therefore such tracing results in time consuming debugging.

Moreover, because as mentioned above, the number of trace messages that are stored is extensive, conventional tracing practices resort to utilizing available disk space of software devices for storing the extensive trace messages. This writing to disk creates significant amounts of overhead during the writing to disk, e.g., disk input/output (I/O) operations, which is time consuming.

In sharp contrast to the time consuming conventional debugging techniques described above which are known to cause overhead, various embodiments and/or approaches described herein include storing only limited identifying information of a computer code for subsequently resolving error conditions. Because only the limited identifying information is stored and used for determining a cause of and/or fix for error conditions, overhead is minimal and error conditions are debugged in a timely manner.

Figure 3A:
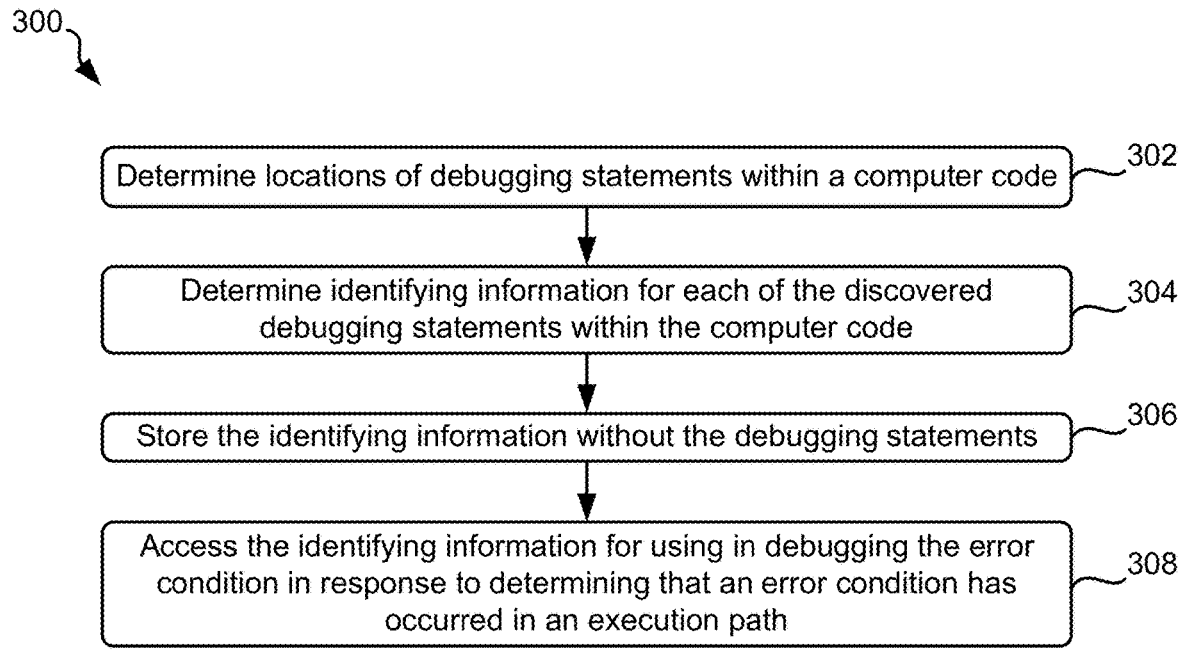
FIG. 3A is a flowchart of a method, in accordance with one embodiment.

Now referring to FIG. 3A, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 of method 300 includes determining locations of debugging statements within a computer code. In some approaches, known techniques are utilized for distinguishing between debugging statements of the computer code and other portions of the computer code. The computer code may include any type of code, and may be stored on any type of memory. For example, according to various approaches, the computer code may be stored on memory of a device, e.g., a laptop, a phone, a tablet, etc., where the device is configured to execute the computer code.

The locations of debugging statements within the computer code may be determined at any time. In preferred approaches, the locations of debugging statements within the computer code are determined while debugging operations and/or tracing of the computer code are disabled, e.g., disabled by a controller of a device on which the computer code is stored/configured. In another approach, the locations of debugging statements within the computer code are determined during execution of the computer code, e.g., during normal use of the computer code by a device. In contrast, in some approaches, the locations of debugging statements within the computer code are determined during non-use of the computer code. For example, in one approach, during non-use of the computer code, an auditing may be performed on the computer code during which the computer code is parsed and the location of debugging statements therewithin are determined.

Identifying information is determined for each of the discovered debugging statements within the computer code, e.g., see operation 304. The identifying information may be predetermined, e.g., by a programmer, by a format used for organizing the computer code, etc., and/or in some approaches, known tracing techniques may be used to establish the predetermined identifying information of the debugging statements. The identifying information is preferably only a portion of the debugging statements of the computer code. As will be described in greater detail elsewhere below, the identifying information may be used to determine information, e.g., the location of a source file, an address of trace code instructions that may be used for decoding a source file number and/or line number, an execution path in which an error condition occurred, etc., that may be used for debugging an error condition that occurs during utilization, e.g., execution, of the computer code.

In some approaches, identifying information is only determined for a portion of the computer code and/or a portion of the discovered debugging statements. For example, identifying information may be determined for certain lines of the computer code, e.g., the last five lines of the computer code, the last ten lines of the computer code, the first fifteen lines of the computer code, etc. This allows for granular control for resource utilization.

According to various approaches, the identifying information may include any one or more of, e.g., a file identifier, a file name, a file number, a line number, etc. The file that the identifying information refers to may be any file or specific portion thereof that can be used for decoding an error condition that occurs during execution of the computer code. In preferred approaches, the file that the identifying information refers to is a source file. For example, in one preferred approach, the identifying information includes a file identifier and a line number. In such an approach, the file identifier is a source file identifier and identifies a source file that includes code that may be used in root cause analysis for determining a cause of and/or a fix for an error condition, as will be described in greater detail elsewhere herein. Moreover, the line number is a line number of the source file and may indicate one or more specific line(s) of the source file, e.g., lines of code of the source file, that are used for root cause analysis. In another approach, the file identifier identifies a source file that was used during an execution in which an error condition occurred, and the line number indicates a portion of the source file that was being performed upon the error condition occurring.

An execution of the computer code may, in some approaches, utilize a plurality of source files. In at least some of such approaches, the identifying information may include a source file number and/or one or more hash values. In one approach, a source file number may be generated by a compiler, e.g., of a device on which method 300 is being performed. Moreover, in another approach, a hash value may be generated by software for the source file. A source file numbers and/or a hash value may be used to identify the location of a particular source file of the plurality of source files, e.g., such as when accessing of the source file is utilized during root cause analysis for determining a cause of and/or a fix for an error condition.

Operation 306 of method 300 includes storing the identifying information. The identifying statements may be stored without the debugging statements. The identifying information may be stored at any location, e.g., on a device performing method 300, on a device that is utilizing the computer code, on cloud based memory, in temporary memory, etc. It should be noted that in at least some approaches, because the identifying information consumes only a relatively small amount of memory, storing of the identifying information preferably does not consume disk space on a device on which method 300 is being performed. Instead, the identifying information is preferably stored on other memory of such a device.

In some approaches, the identifying information may be stored at a plurality of locations where the computer code includes a plurality of different threads. For example, looking to FIG. 3B, several sub-processes are illustrated in accordance with one embodiment, one or more of which may be used to perform operation 306 of FIG. 3A. However, it should be noted that the sub-processes of FIG. 3B are illustrated in accordance with one embodiment which is in no way intended to limit the embodiments and/or approaches described herein.

Figure 3B:
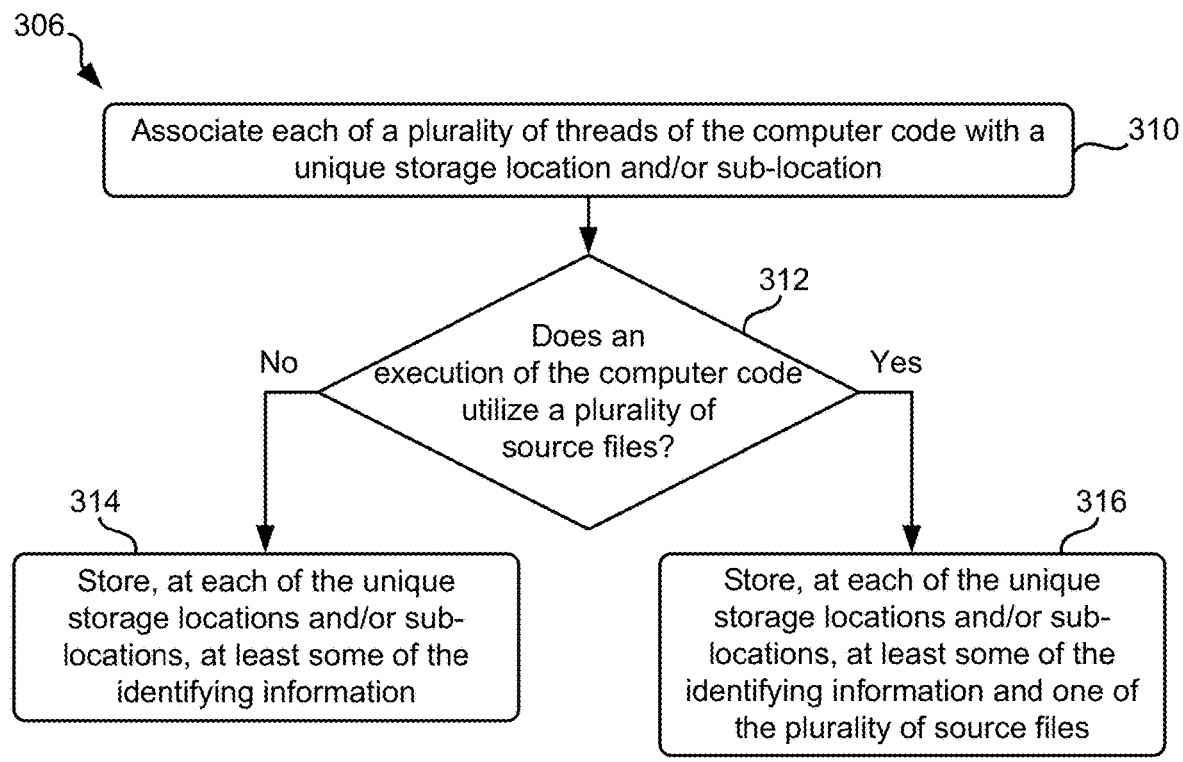
FIG. 3B is a flowchart of sub-processes of an operation of the flowchart of the method of FIG. 3A, in accordance with one embodiment.

In one approach, each of a plurality of threads of the computer code may be associated with a unique storage location and/or sub-location, e.g., see sub-process 310 of FIG. 3B. Each of the unique storage location(s) and/or sub-location(s) may be located within the same device, or alternatively the unique storage location(s) and/or sub-location(s) may be located on a number of different devices and/or at a number of different locations.

In some approaches, some executions of the computer code may utilize a single source file, while other executions of the computer code, e.g., non-trivial executions of the computer code, may utilize a plurality of source files.

Accordingly, in one approach, operation 306 of method 300 optionally includes determining whether an execution of the computer code utilizes a plurality of source files, e.g., see decision 312. In response to determining that an execution of the computer code does not utilize a plurality of source files, at least some of the identifying information is stored at each of the unique storage locations and/or sub-locations, e.g., see sub-operation 314. In some approaches, at least some of the unique storage locations and/or sub-locations may have the same identifying information stored thereon, while in some other approaches at least some of the unique storage locations and/or sub-locations have unique identifying information stored thereon.

In response to determining that an execution of the computer code utilizes a plurality of source files, in one approach, at least some of the identifying information and at least one of the plurality of source files are stored at each of the unique storage locations and/or sub-locations, e.g., see sub-operation 316. In some approaches, at least some of the unique storage locations and/or sub-locations may have the same identifying information stored thereon, while in some other approaches at least some of the unique storage locations and/or sub-locations may have unique identifying information stored thereon. Similarly, in some approaches, at least some of the unique storage locations and/or sub-locations may have the same source file stored thereon, while in some other approaches at least some of the unique storage locations and/or sub-locations may have a different source file stored thereon.

The storing of the identifying information preferably does not significantly increase a current memory consumption of a memory on which the identifying information is stored. For example, according to one approach, the storing of the identifying information consumes at most 5% of a memory consumption of memory that the debugging statements and/or trace messages thereof would otherwise consume if stored in entirety in the memory. This ensured minor consumption of memory is beneficial, as it preserves available memory for other tasks, while storing enough information to be used in determining a cause of and/or a fix for error conditions that occur (e.g., see operation 308).

Moreover, the storing of the identifying information preferably does not result in run-time CPU overhead. For example, although the identifying information may be stored at any time, in order to prevent such overhead from occurring, the identifying information may be stored at specific times and/or just prior to predetermined operations occurring. For example, in one preferred approach, in order to avoid run-time CPU overhead, storing the identifying information includes hashing the identifying information during compiling, e.g., as opposed to during run-time. Hashing the identifying information during compiling also results in relatively less memory being utilized for storing the identifying information than would otherwise be consumed in performing such storing prior to compiling.

With continued reference to method 300, an error condition may occur in an execution path of the computer code at any time. In response to determining that an error condition has occurred in an execution path, the identifying information is accessed for using in debugging the error condition, e.g., see operation 308 of method 300.

Upon being accessed, in some approaches the identifying information is used for root cause analysis. The root cause analysis may be of a type known in the art, however, note that in the present approach, such root cause analysis preferably is able to determine a cause of and/or a fix for the error condition using only the identifying information. For example, the identifying information may specifically indicate for the root cause analysis what source code file and line thereof to use for remedying an error condition.

According to a more specific approach, accessing the identifying information may include logging the stored identifying information, e.g., to a log file. In one approach, the logging of the identifying information may be performed using a ring buffer. It should be noted that in sharp contrast to conventional error condition debugging performed using ring buffers, in which extensive amounts of information are stored and maintained in a ring buffer, in utilizing a ring buffer in method 300, only the limited identifying information is logged for debugging the error condition. In some approaches, the identifying information may be logged in a log file in memory of a system in which method 300 is being performed, depending on the tracing environment.

In some approaches, one or more error condition details, e.g., timestamp information, determined type of error, a thread in which the error condition occurred, what function of the computer code was being executed upon the error condition occurring, etc., may additionally be logged with the identifying information, if such information is not already included in the stored identifying information.

There are numerous benefits that are provided to systems that utilize various approaches and/or embodiments described herein, such as method 300. For example, it is estimated by Inventors that in 70-80% of instances of an error conditions occurring in an execution path of computer code, logging the identifying information as described herein will result in discovery of a fix for and/or a cause of the error condition. Accordingly, as a result of storing and thereafter using the identifying information to fix an error condition that has occurred, less processing is utilized than is otherwise utilized in conventionally storing and logging extensive amounts of information in an attempt to recreate and thereafter fix an error condition. For example, recall that conventional techniques do not store trace information while debugging is disabled, and therefore such conventional techniques do not have any information available for performing error root cause analysis upon an error condition occurring. The conventional techniques therefore rely on the time consuming process of backing out extensive amounts of information stored on disk space for performing debugging in an attempt to mitigate an error condition. In sharp contrast, several of the approaches and/or embodiments described herein, such as method 300, store and thereafter have available a relatively small amount of identifying information available for mitigating an error condition that occurs in an execution path of computer code. With less processing being performed in using the identifying information for debugging an error condition, the time consumed in debugging and thereby mitigating an error condition that has occurred, is also be reduced. Accordingly, as a result of implementing various embodiments and/or approaches described herein in software devices, the overall performance of such devices improves.

FIG. 4 depicts pseudocode 400 trace messages, in accordance with one embodiment. As an option, the present pseudocode 400 may be implemented in conjunction with features from any other embodiment listed herein, such as those described with reference to the other FIGS. Of course, however, such pseudocode 400 and others presented herein may be used in various applications and/or in permutations which may or may not be specifically described in the illustrative embodiments listed herein. Further, the pseudocode 400 presented herein may be used in any desired environment.

The pseudocode 400 depicts an overview of using identifying information for mitigating an error condition according to one approach. For example, section 402 of the pseudocode 400 notes that while tracing and/or debugging is enabled, trace messages are utilized for fixing error conditions that occur during an execution path of computer code. In contrast, while tracing and/or debugging is disabled, e.g., see "} else {" at section 404 of the pseudocode 400, identifying information, e.g., file identity, line number, instruction address value, are determined and stored, e.g., see section 406 of the pseudocode 400. Subsequently storing the identifying information, in response to determining that an error condition has occurred in an execution path during utilization of the computer code, the identifying information may be accessed for using in debugging the error condition. For example, as noted in section 408 of the pseudocode 400 the identifying information is dumped, e.g., "dump all entries from trace store," in the defined LogError( ) function.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising: determining locations of debugging statements within a computer code, wherein the locations of debugging statements within the computer code are determined while debugging operations are disabled; determining identifying information about the discovered debugging statements within the computer code; storing, in a memory, the identifying information about the discovered debugging statements without storing the discovered debugging statements, wherein the storing of the identifying information consumes at most 5% of a memory consumption of the memory that the debugging statements would otherwise consume if stored in entirety in the memory; and in response to determining that an error condition has occurred in an execution path, accessing the identifying information for using in debugging the error condition.

2. The computer-implemented method of claim 1, wherein the identifying information includes at least one type of information selected from the group consisting of: a file identifier, a file name, and a line number.

3. The computer-implemented method of claim 1, wherein storing the identifying information includes hashing the identifying information during compiling.

4. The computer-implemented method of claim 1, wherein the identifying information is used for root cause analysis upon being accessed, wherein the accessing includes logging the stored identifying information.

5. The computer-implemented method of claim 1, wherein the identifying information includes a source file identifier and a line number within the source file, wherein the storing includes only storing the source file identifier and the line number in the memory.

6. The computer-implemented method of claim 1, comprising: associating each of a plurality of threads of the computer code with a unique storage location and/or sub-location, wherein storing the identifying information includes storing, at each of the unique storage locations and/or sub-locations, at least some of the identifying information.

7. The computer-implemented method of claim 6, comprising: determining whether an execution of the computer code utilizes a plurality of source files; and in response to determining that an execution of the computer code utilizes a plurality of source files, storing, at each of the unique storage locations and/or sub-locations, one of the plurality of source files.

8. A computer program product for resolving error conditions using limited stored identifying information of a computer code, the computer program product comprising a computer readable storage medium having program instructions embodied therewith, the program instructions readable and/or executable by a computer to cause the computer to: determine, by the computer during non-use of the computer code, locations of debugging statements within the computer code, wherein only a predetermined number of lines of a last portion of the computer code are considered for determining the locations of the debugging statements; determine, by the computer, identifying information about the discovered debugging statements within the computer code; store, by the computer to a memory, the identifying information about the discovered debugging statements without storing the debugging statements; and in response to determining that an error condition has occurred in an execution path, access, by the computer, the identifying information for using in debugging the error condition.

9. The computer program product of claim 8, wherein the locations of debugging statements within the computer code are determined while debugging operations of the computer code are disabled.

10. The computer program product of claim 8, wherein the identifying information includes at least one type of information selected from the group consisting of: a file identifier, a file name, and a line number.

11. The computer program product of claim 8, wherein storing the identifying information includes hashing the identifying information during compiling.

12. The computer program product of claim 8, wherein the identifying information is used for root cause analysis upon being accessed, wherein the accessing includes logging the stored identifying information.

13. The computer program product of claim 8, wherein the identifying information is stored to a log file.

14. The computer program product of claim 8, the program instructions readable and/or executable by the computer to cause the computer to: associate, by the computer, each of a plurality of threads of the computer code with a unique storage location and/or sub-location, wherein storing the identifying information includes storing, at each of the unique storage locations and/or sub-locations, at least some of the identifying information.

15. The computer program product of claim 14, the program instructions readable and/or executable by the computer to cause the computer to: determine, by the computer, whether an execution of the computer code utilizes a plurality of source files; and storing, by the computer, at each of the unique storage locations and/or sub-locations, one of the plurality of source files, in response to a determination that an execution of the computer code utilizes a plurality of source files.

16. A system, comprising: a processor; and logic integrated with the processor, executable by the processor, or integrated with and executable by the processor, the logic being configured to: determine locations of debugging statements within a computer code, wherein the locations of debugging statements within the computer code are determined while debugging operations are disabled; determine identifying information about the discovered debugging statements within the computer code; store, in a memory, the identifying information about the discovered debugging statements without storing the discovered debugging statements, wherein the storing of the identifying information consumes at most 5% of a memory consumption of the memory that the debugging statements would otherwise consume if stored in entirety in the memory; and in response to determining that an error condition has occurred in an execution path, access the identifying information for using in debugging the error condition.

17. The system of claim 16, wherein only a predetermined number of lines of a last portion of the computer code are considered for determining the locations of the debugging statements.

18. The system of claim 16, wherein the identifying information includes at least one type of information selected from the group consisting of: a file identifier, a file name, and a line number.

19. The system of claim 16, wherein storing the identifying information includes hashing the identifying information during compiling.

* * * * *